United States Patent [19]
Someya et al.

[11] Patent Number: 5,290,972
[45] Date of Patent: Mar. 1, 1994

[54] STYLUS PEN

[75] Inventors: Hisao Someya; Mitsunori Hoshi, both of Saitama; Takashi Ejiri, Tokyo; Takashi Takizawa, Tokyo; Ryoji Nagano, Tokyo, all of Japan

[73] Assignee: Fujikura Rubber Ltd., Tokyo, Japan

[21] Appl. No.: 9,236

[22] Filed: Jan. 26, 1993

[30] Foreign Application Priority Data

Jul. 13, 1992 [JP] Japan .................. 4-185074

[51] Int. Cl.⁵ ............................... G08C 21/00
[52] U.S. Cl. .......................................... 178/18
[58] Field of Search ................. 178/18, 19, 20; 340/710, 700, 708, 707, 706; 364/709.11

[56] References Cited

U.S. PATENT DOCUMENTS

| | | | |
|---|---|---|---|
| 4,141,073 | 2/1979 | Tan | 364/709.11 X |
| 4,241,409 | 12/1980 | Nolf | 364/709.11 X |
| 4,263,592 | 4/1981 | Takahashi et al. | 340/706 X |
| 4,677,428 | 6/1987 | Bartholow | 340/708 |
| 4,705,942 | 11/1987 | Budrikis et al. | 340/707 X |

Primary Examiner—Curtis Kuntz
Assistant Examiner—Paul Loomis

[57] ABSTRACT

A stylus pen for use as a computer input device includes a pen holder with an associated tip, a chamber defined in the pen holder and filled with a non-compressible fluid, a pressure sensor having a pressure receiving surface that detects pressure in the chamber, and a means for converting a mechanical force applied to the tip to a change in pressure of the non-compressible fluid enclosed in the chamber. In the use of the pen a mechanical force applied to the tip changes the pressure of the non-compressible fluid; and this pressure change is detected by the pressure sensor to produce a change in the output signal from the sensor usable as a computer input.

17 Claims, 4 Drawing Sheets

STYLUS PEN

BACKGROUND OF THE INVENTION

1. Field of the Invention

The present invention relates to a stylus pen (input device) which is used to input information into information processing equipment, such as a computer.

2. Description of Related Art

A conventional stylus pen, which is used as an input device of a computer, typically displays positional data (i.e., two-dimensional data in a cartesian coordinate system) on an input and output display (i.e., board or panel) and is merely an input device auxiliary to the keyboard. A stylus pen is known which has a switch that is turned ON and OFF in response to mechanical displacement of a nib (i.e., writing tip) or pressure applied to the nib. Such a device is used, for example, to indicate selection of letters, FIGURES, or symbols on a display screen, input necessary operations, input positional data of a coordinate system on the display screen, draw freehand FIGURES or letters, or identify the same, etc. The pressure applied to the tip of the stylus pen is detected by a pressure sensor which actuates the switch when the detected pressure is above or below a predetermined threshold value.

In recent computers which do not use a keyboard as an input means, it is necessary to provide the stylus pen with a 3-dimensional input function (i.e., an input function using Z-directional data of a cartesian coordinate system in addition to X-Y coordinate data). In such a known stylus pen having an X-Y-Z coordinate data inputting function, color density data is input and the size of a selected FIGURES or letter is changed in accordance with the pressure (i.e., mechanical force) applied to the tip.

In conventional stylus pens which can detect mechanical force, detection is in principle effected in accordance with an output, such as resistance, electrostatic capacity, or magnetic field, which varies depending on the stroke (i.e., linear reciprocating movement) of the tip of the pen. Therefore, in order to increase the output, it is necessary to increase the stroke of the tip. However, it is difficult for a user to use a stylus pen having a large stroke.

Furthermore, the known type of stylus pen in which a mechanical displacement of the tip is directly applied to a diaphragm of the pressure sensor, as mentioned above, does not have a large resistance to shock or overload. Consequently, for instance, if the pen is accidentally dropped, inducing shock to the pen tip, the pen can be easily broken. In practice, during the course of usage of the stylus pen, for example, with a personal computer, the stylus pen is often dropped, etc., jamming the tip of the pen. Accordingly, to increase the life of the pen, it is necessary to provide a stylus pen tip that is capable of withstanding a large degree of external shock.

SUMMARY OF THE INVENTION

The primary object of the present invention is to eliminate the above-mentioned drawbacks by providing a shockproof stylus pen which can precisely detect a mechanical force applied to a tip thereof, regardless of the amount of stroke of the tip.

Another object of the present invention is to provide a stylus pen having a tip which has a very small, essentially undetectable, amount of play (i.e., degree of linear reciprocating movement), so that the stylus pen can be easily used.

According to the present invention, there is provided a stylus pen comprising a pen holder having a tip, a pressure chamber defined in the pen holder which is filled with a non-compressible fluid, a pressure sensor having a pressure receiving surface, which detects the pressure of the pressure chamber, and a converting means for converting a mechanical force applied to the tip to a change in pressure of the non-compressible fluid enclosed in the pressure chamber.

The non-compressible fluid referred to in the present invention includes liquid and any material that is between a liquid and solid state including gel, jelly, glue, grease, wax, etc.

In the arrangement described above, since pressure is applied to the pressure sensor through the liquid, for example, contained in the pressure chamber, when the stylus pen tip is impacted against a surface, the shock can be partly absorbed by or diffused in the liquid. Thus, a direct shock is prevented from being transmitted directly to the pressure sensor, thereby preventing the same from being broken.

Furthermore, in the present invention, the output of the pressure sensor can be detected from a slight variation in the mechanical force applied through a very small stroke of the tip of the pen.

In particular, since the pressure sensor detects the pressure change through the liquid in the pressure chamber, a slight displacement of the tip can be represented by a variation in output of the pressure sensor. Accordingly, more accurate Z-axis data can be obtained, so that the color density or the size of the FIGURES or letters can be precisely controlled.

Preferably, a stylus pen further comprises a shaft on which the tip is located, and which is slidably inserted in the pen holder.

Preferably, a stylus pen further comprises a spring for biasing the shaft into contact with the flexible member. Consequently, the position of the tip will be stable regardless of the posture of the pen holder. Furthermore, the pressure chamber has a predetermined initial pressure when no mechanical force is applied to the tip.

In a preferred embodiment, the flexible member is in the form of a diaphragm or bellows.

The flexible member can be made of rubber, synthetic resin, or metal. Preferably, the flexible member is made of a rubber material having a high flexibility so as to absorb the voluminous change of the non-compressible fluid due to a change in temperature.

The fluid contained in the pressure chamber is an inactive liquid silicone material.

The pressure sensor is preferably constituted by a semiconductor pressure sensor using silicone. The semiconductor pressure sensor directly transmits the pressure to the thin silicone monocrystal diaphragm, so that the pressure is converted to the voltage through a bridge resistor provided on a rear surface of the diaphragm, owing to the piezo-electronic effect. If a semiconductor pressure sensor using silicon is used, the fluid enclosed in the pressure chamber is preferably a silicone liquid material or elastomer. A silicone gel or silicone oil can also be used. These materials are substantially inactive with respect to the pressure sensor with which the fluid comes into contact.

According to another aspect of the present invention, a stylus pen comprises a pen holder, a shaft which is slidably inserted in the pen holder and which has a tip projecting outward from a front end of the pen holder, a piston integrally provided on a rear end of the shaft, a pressure chamber having a flexible member which is deformed by the piston when a mechanical force is applied to the tip, the pressure chamber being filled with a non-compressible fluid, and a pressure sensor that detects the pressure of the non-compressible fluid contained in the pressure chamber to issue an output in accordance with the received pressure.

The invention is also addressed to an inputting method of a stylus pen having a pressure sensor comprising a first step of converting a mechanical force applied to a tip of the stylus pen to a pressure change of a non-compressible fluid contained in a closed chamber, and a second step of transmitting the pressure change to the pressure sensor.

The present disclosure relates to subject matter contained in Japanese patent application No.4-185074 (filed on Jul. 13, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
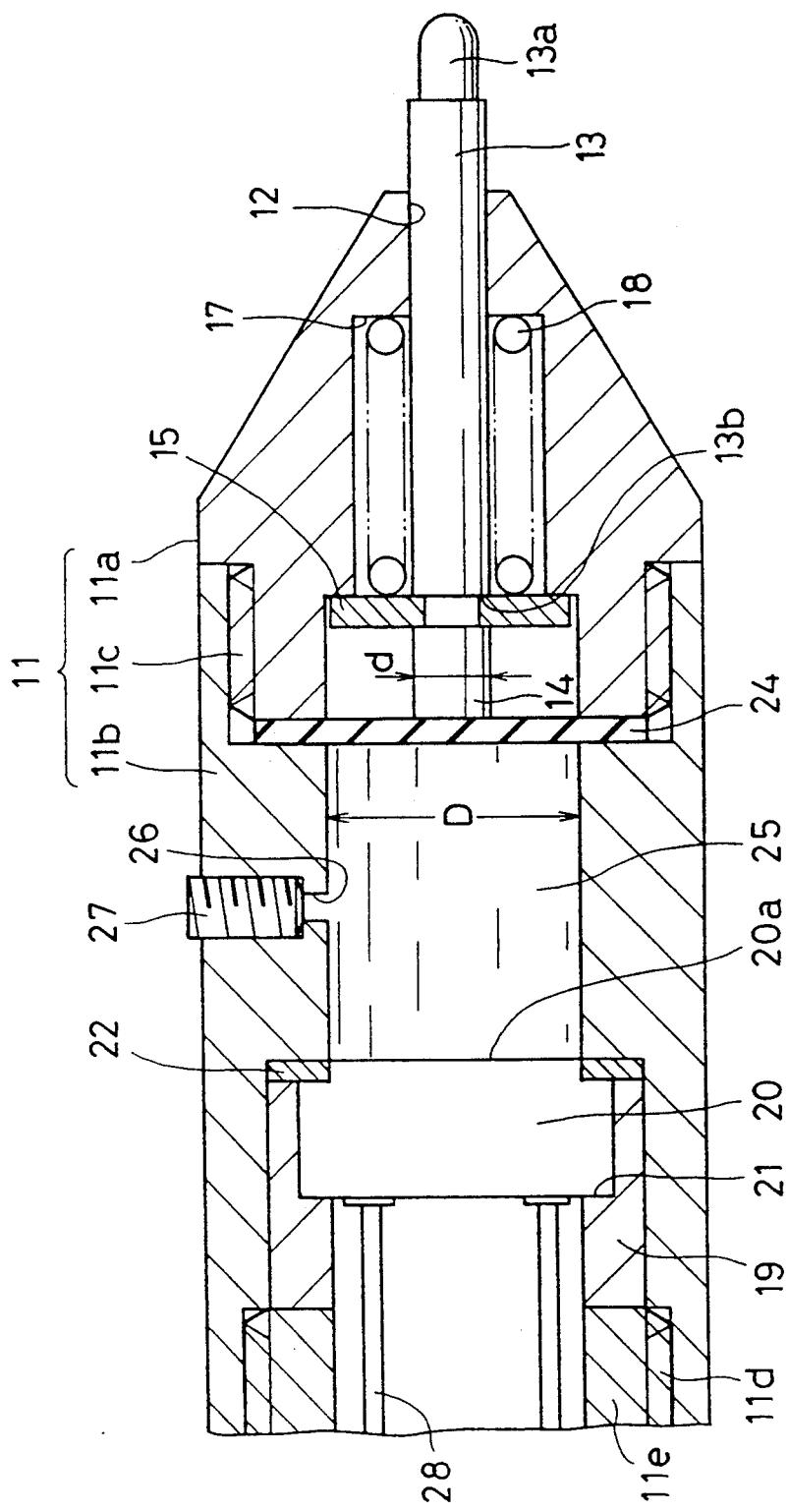
FIG. 1 is a sectional view of a main part of a stylus pen according to an embodiment of the present invention.
Figure 2:
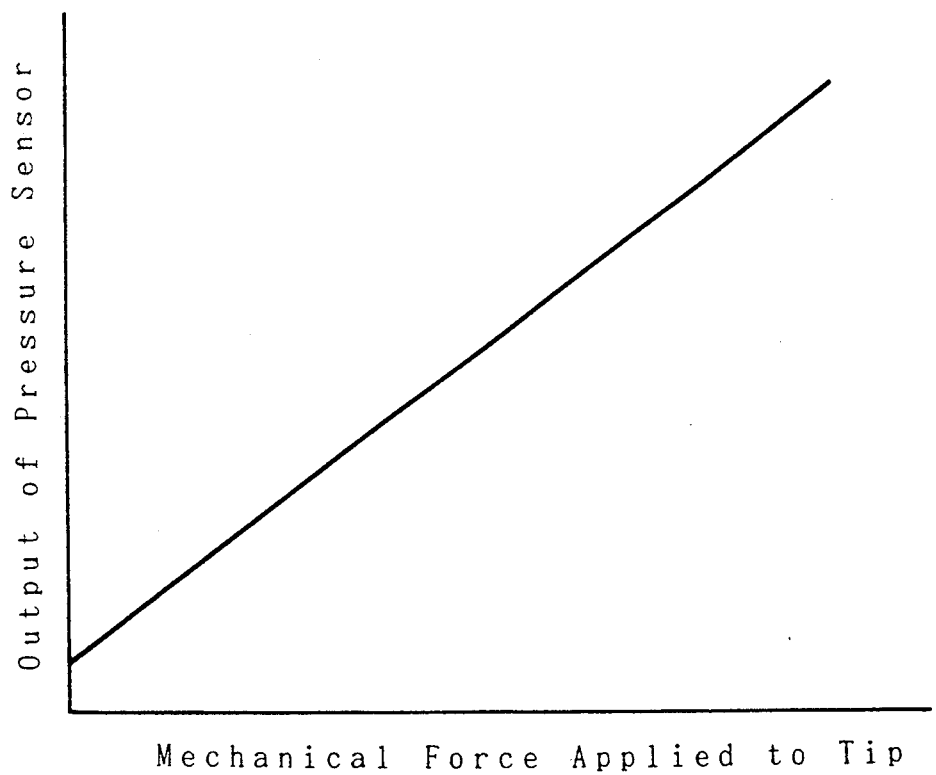
FIG. 2 is a graph showing input and output characteristics of a stylus pen according to the present invention.

FIGS. 1 and 2 show a first embodiment of the present invention, in which a pen holder 11 is comprised of a front cylindrical portion 11a having a conical front end, and a rear cylindrical portion 11b in which the front cylindrical portion 11a is screwed through a threaded portion 11c. The front cylindrical portion 11a has a center axial hole 12 in which a shaft 13 is slidably inserted. The shaft 13 projects from the front cylindrical portion 11a. Tip 13a is provided on the outer front end of the shaft 13 with a point (contact) 13a having a smaller diameter than the shaft 13. The shaft 13 has an annular groove 13b provided on the rear end, or in the vicinity thereof. A spring seat 15 is fitted in the annular groove 13b. The rear end of the shaft 13 behind the spring seat 15 constitutes a piston 14. A compression spring 18 is provided between the spring seat 15 and a stepped shoulder 17 of the front cylindrical portion 11a, so that the shaft 13 is continuously biased by the compression spring 18 in the left hand direction in FIG. 1.

A spacer ring 19 is inserted in the rear cylindrical portion 11b from the rear end side. The spacer ring 19 is provided on the inner surface thereof with a stepped supporting portion 21 with which a pressure sensor 20, having output terminals 38, comes into contact at a peripheral edge of a rear surface of the pressure sensor 20. A seal packing 22 is provided on the rear surface of the pressure sensor 20 between the latter and the inner stepped portion of the rear cylindrical portion 11b. The spacer ring 19 and the pressure sensor 20 are pressed forward by a retainer ring 11e which is screwed in the inner threaded hole of the rear cylindrical portion 11b through a threaded portion 11d to compress the sealing packing 22.

A rubber diaphragm 24 is provided between the rear of the front cylindrical portion 11a and the front end of the rear cylindrical portion 11b. The diaphragm 24 is held by and between the front cylindrical portion 11a and the rear cylindrical portion 11b at the peripheral edge of the diaphragm 24. The pressure sensor 20, the seal packing 22 and the rubber diaphragm 24 define a liquid-tight pressure chamber 25 which is filled with a non-compressible fluid, for example, a liquid or any material that is between a liquid and solid state (e.g., silicone gel) through a supply port 26 formed in the rear cylindrical portion 11b. The supply port 26 is closed by a closing plug 27 which is screwed into the rear cylindrical portion 11b, after the liquid is introduced in the pressure chamber 25 through the supply port 26 and air is discharged from the pressure chamber 25 through the supply port 26 to remove gas from the pressure chamber 25.

The pressure sensor 20 has a front surface which defines a pressure receiving surface 20a which is made of, for example, a thin silicon monocrystal diaphragm, and is provided on the rear surface thereof with a piezoelectric bridge resistor formed thereon by diffusion, so that the pressure applied to the pressure receiving surface 20a can be detected as a voltage due to the piezoelectric resistor effect.

The piston 14 which is biased by the compression spring 18 comes into contact, at the rear end thereof, with the opposite surface of the diaphragm 24 located opposite the pressure chamber 25, so that the liquid in the pressure chamber 25 is pressurized by the piston 14. Consequently, a predetermined initial pressure is exerted on the liquid in tile pressure chamber 25. The outer diameter d of the piston 14 is smaller than the inner diameter D of the pressure chamber 25.

In the stylus pen as constructed above, if the tip 13a or the shaft 13 is struck against a surface, the force of impact is transmitted to the pressure sensor 20 through the liquid in the pressure chamber 25. Namely, the external force applied to the tip 13a is uniformly diffused in all directions in the liquid in the pressure chamber 25, so that only a portion of the external force is transmitted to the pressure sensor 20. In other words, the impact applied to the tip 13a is partly absorbed by the liquid in the pressure chamber 25. Consequently, the stylus pen is much more resistant to shock due to the damping affect of the liquid in the pressure chamber 25, for example, if the stylus pen is dropped.

In a normal use, if the tip 13a is depressed against an input and output board (not shown) by a user who holds the pen holder 11, the piston 14 is forced in the left hand direction in FIG. 1, thereby applying force to the liquid in the pressure chamber 25 through the diaphragm 24. Accordingly, the pressure in the pressure chamber 25 is increased. The increased pressure is detected by the pressure sensor 20 whose output terminals 28 issue an output corresponding to the mechanical force applied to the tip 13a.

FIG. 2 is a graph which shows a schematic relationship between the mechanical force applied to the tip 13a and the outputs of the pressure sensor 20, by way of example. As discussed above, there is a predetermined output of the pressure sensor 20 corresponding to the initial pressure exerted thereon by the compression spring 18 when no mechanical force is applied to the tip 13a. As can be seen in FIG. 2, the mechanical force applied to the tip 13a is proportional to the output of the pressure sensor 20. It should be appreciated that there is substantially no displacement of the shaft 13 during the application of the mechanical force to the tip 13a. The output terminals 28 of the pressure sensor 20 are connected to corresponding information input terminals of a computer (not shown).

The tip shaft 13 is inwardly biased by the compression spring 18 to give a predetermined initial pressure to the liquid contained in the pressure chamber 25, as mentioned above. Accordingly, the position of the tip 13a is stable, regardless of the direction of the pen holder 11. Furthermore, the output of the pressure sensor 20 is insignificantly influenced by the posture of the pen holder 11.

The rubber diaphragm 24 can be replaced with a metal diaphragm to which the piston 14 (shaft 13) can be secured. In this alternative, the compression spring 18 can be dispensed with.

Figure 3:
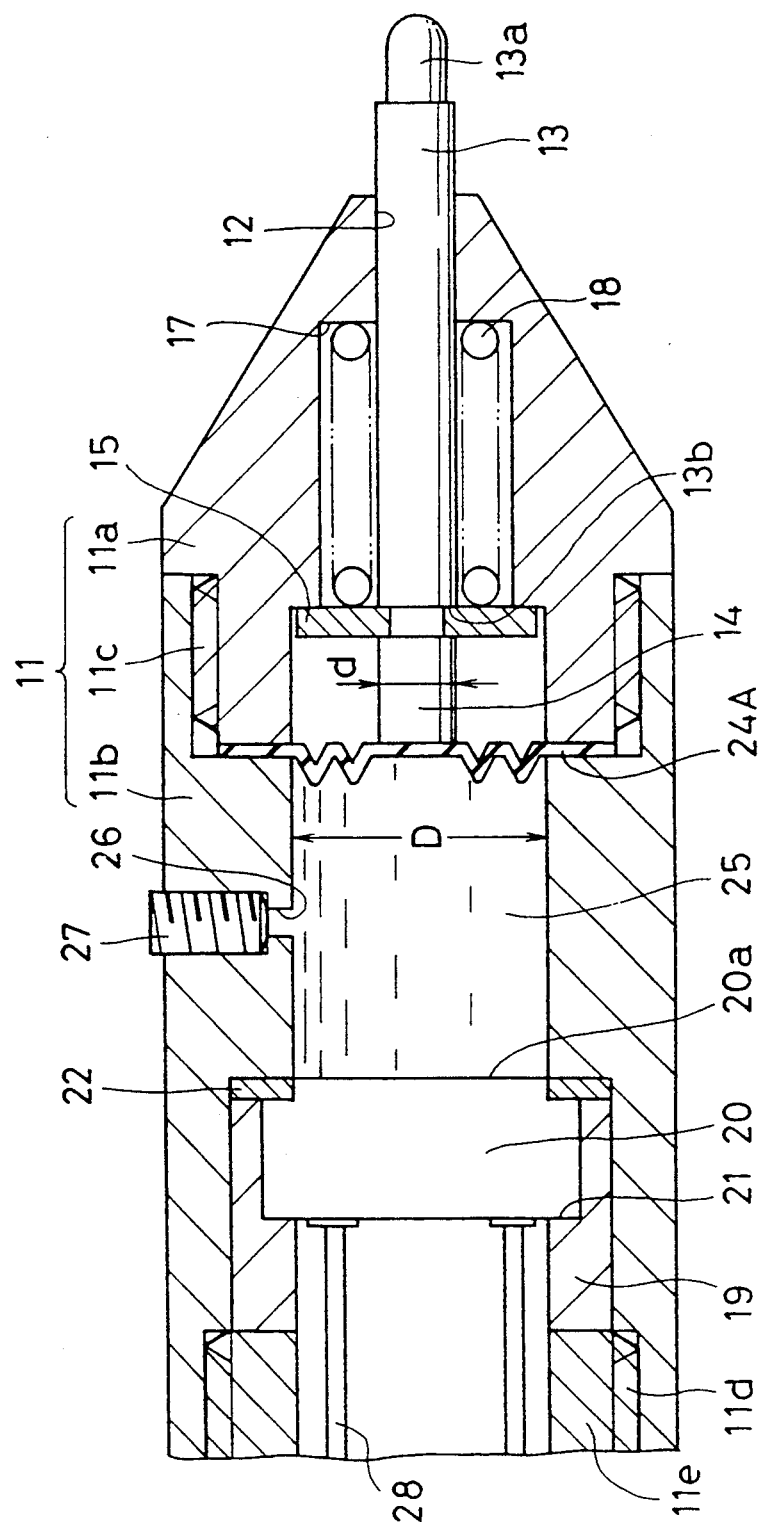
FIG. 3 is a sectional view of a main part of a stylus pen according to another embodiment of the present invention; and, FIG. 4 is a sectional view of a main part of a stylus pen according to still another embodiment of the present invention.
Figure 4:
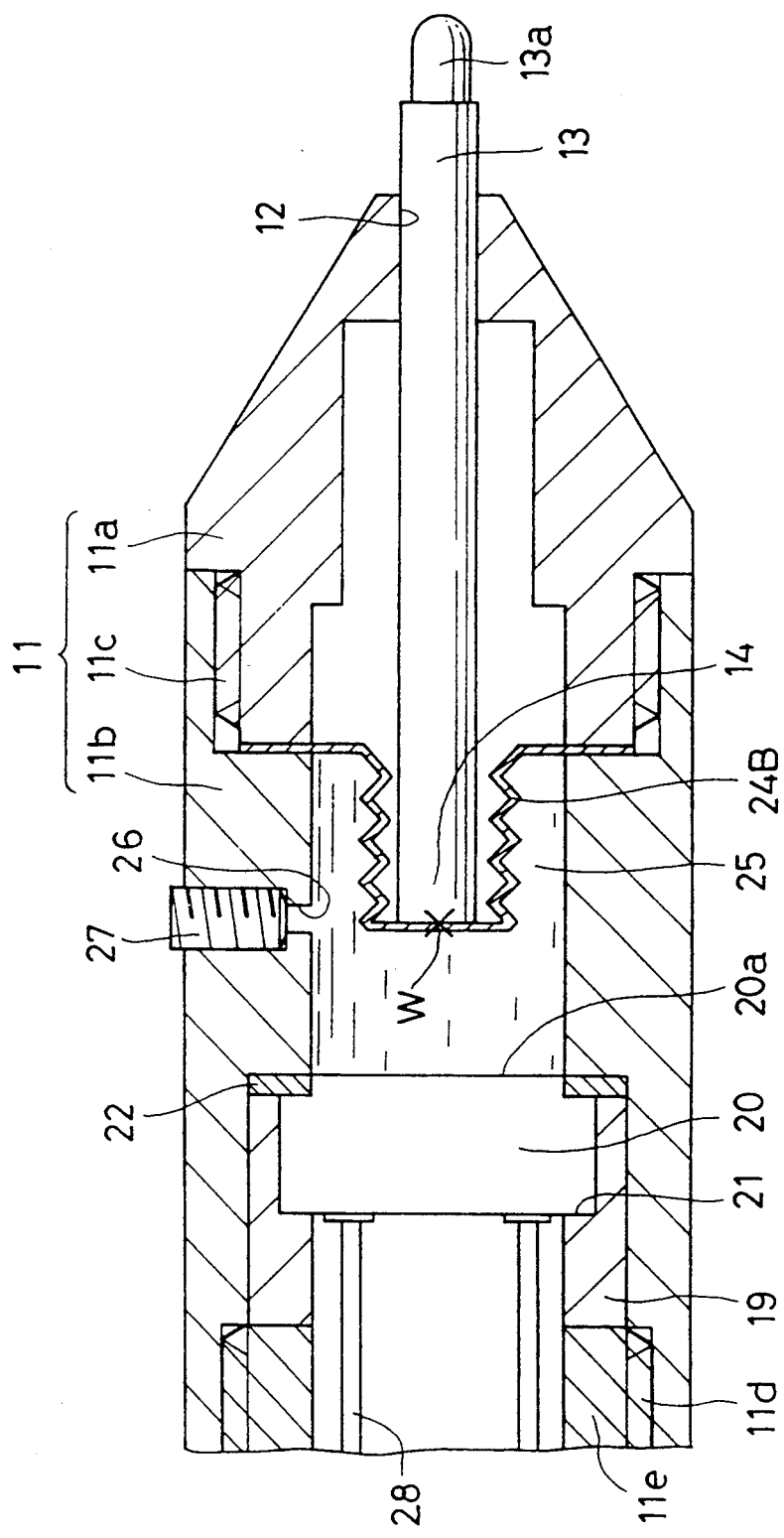

FIGS. 3 and 4 show two different embodiments of a stylus pen according to the present invention. In FIG. 3, a bellows type diaphragm 24A is used in place of the flat plate-like rubber diaphragm 24 shown in FIG. 1. Namely, the diaphragm 24A is partly bellows-shaped in cross section to increase the surface area thereof. The diaphragm 24A having a larger surface area exhibits a more effective shock absorbing or damping effect than the flat plate-like diaphragm 24 shown in FIG. 1.

In FIG. 4, a bellows 24B is used instead of the diaphragm 24 shown in FIG. 1 or the diaphragm 24A shown in FIG. 3. It is apparent that a shock damping effect similar to that in FIG. 1 or 3 can be expected from the bellows 24B. The bellows 24B can be made of a rubber material synthetic resin material, or metal material, etc., similar to the diaphragm 24 or 24A. In the illustrated embodiment, the bellows 24B is made of a metal material, and the shaft 13 is secured to the metal bellows 24B at a connecting portion W. The compression spring 18 shown in FIG. 4 is not provided.

Note that in FIGS. 3 and 4, the components corresponding to those in FIG. 1 are designated with the same reference numerals as those in FIG. 1.

As can be seen from the above discussion, according to the present invention, since the mechanical force applied to the tip is transmitted to the pressure sensor through the liquid contained in the pressure chamber, even if a shock is exerted on the tip, for example, when the stylus pen is dropped, the shock is absorbed or dampened by the liquid, so that the stylus pen can be prevented from being broken. In normal use, the mechanical force applied to the tip is linearly and precisely detected by the pressure sensor whose output varies, depending on the mechanical force, so that even the slightest Z-axis data can be precisely input to an associated computer to which the stylus pen is connected. Consequently, the size of FIGURES or the color density, for example, indicated by the input and output board, can be accurately controlled in accordance with the output of the pressure sensor. Furthermore, according to the present invention, the identification of handwritten letters in accordance with the mechanical force data is improved. Consequently, the stylus pen of the present invention, as an input means of a computer, has an improved applicability.

We claim:
1. A stylus pen comprising:
   a pen holder with an associated tip;
   a chamber contained in the pen holder and filled with a non-compressible fluid;
   a pressure sensor having a pressure receiving surface that detects pressure in the chamber; and,
   a means for converting a mechanical force, applied to the tip, to a change in pressure of the non-compressible fluid enclosed in the chamber.

2. A stylus pen according to claim 1, wherein said non-compressible fluid is liquid, gel, jelly, glue, grease, or wax.

3. A stylus pen according to claim 1, wherein a part of said chamber is defined by a flexible member, and wherein the mechanical force applied to the tip is transmitted to the flexible member.

4. A stylus pen according to claim 1, wherein said pressure receiving surface of the pressure sensor defines a part of the chamber.

5. A stylus pen according to claim 3, wherein said tip is provided by a shaft which is slidably inserted in the pen holder, said shaft having a front end portion protruding from the pen holder and which front end portion defines said tip.

6. A stylus pen according to claim 5, further comprising a spring for biasing the shaft into contact with the flexible member.

7. A stylus pen according to claim 6, wherein said flexible member is in the form of a diaphragm.

8. A stylus pen according to claim 6, wherein said flexible member is in the form of a bellows.

9. A stylus pen according to claim 8, wherein said pressure sensor comprises a semiconductor pressure sensor made of silicon.

10. A stylus pen according to claim 9, wherein said non-compressible fluid contained in the chamber is an inactive liquid silicone material or elastomer.

11. A stylus pen comprising:
    a pen holder;
    a shaft which is slidably inserted in the pen holder and has a tip projecting out from a front end of the pen holder;
    a piston integrally provided on a rear end of the shaft;
    a chamber having a flexible member which is deformed by the piston when a mechanical force is applied to the tip, said chamber being filled with a non-compressible fluid; and,
    a pressure sensor that detects the pressure of the non-compressible fluid contained in the chamber to issue an output in accordance with the detected pressure.

12. A stylus pen according to claim 11, further comprising a spring for biasing the piston into contact with the flexible member.

13. A stylus pen according to claim 11, wherein said flexible member is made of a diaphragm.

14. A stylus pen according to claim 11, wherein said flexible member is made of a bellows.

15. A stylus pen according to claim 11, wherein said pressure sensor is a semiconductor pressure sensor made of silicon.

16. A stylus pen according to claim 11, wherein said non-compressible fluid contained in the chamber is an inactive liquid silicone material or elastomer.

17. An inputting method of a stylus pen having a pressure sensor, comprising the steps of:
    converting a mechanical force applied to a tip of a stylus pen to a change in pressure of a non-compressible fluid contained in a closed chamber; and,
    transmitting the pressure change to the pressure sensor.

* * * * *

UNITED STATES PATENT AND TRADEMARK OFFICE
CERTIFICATE OF CORRECTION

PATENT NO. : 5,290,972
DATED : March 1, 1994
INVENTOR(S) : Hisao Someya, et. al.

It is certified that error appears in the above-indentified patent and that said Letters Patent is hereby corrected as shown below:

Title page, item [73], Assignee: should read --Fujikura Rubber Ltd. and Fujikura Ltd., both of Tokyo, Japan, as co-owners.--

Signed and Sealed this

Eighteenth Day of April, 1995

Attest:

BRUCE LEHMAN

*Attesting Officer*

*Commissioner of Patents and Trademarks*